United States Patent

[11] 3,614,398

[72] Inventor William C. Choate
Dallas, Tex.
[21] Appl. No. 785,944
[22] Filed Dec. 23, 1968
[45] Patented Oct. 19, 1971
[73] Assignee Texas Instruments Incorporated
Dallas, Tex.

[54] LINEAR EMBEDDED NONLINEAR ADAPTIVE PROCESSOR
10 Claims, 8 Drawing Figs.

[52] U.S. Cl. .......... 235/150.1, 340/172.5, 318/561
[51] Int. Cl. .......... G05b 13/02
[50] Field of Search .......... 235/150, 150.1; 340/172.55; 318/561

[56] References Cited
UNITED STATES PATENTS
3,174,031 3/1965 Hartmanis et al. .......... 235/150 X

*Primary Examiner*—Eugene G. Botz
*Attorneys*—Samuel M. Mims, Jr., James O. Dixon, Andrew M. Hassell, Harold Levine, Rene E. Grossman, Melvin Sharp and Richards, Harris and Hubbard

ABSTRACT: This invention relates to nonlinear processors and more particularly to the utilization both during training and execution of linear subprocessors which are selected and employed in dependence upon the function to be processed and to provide weighting coefficients by which the function to be processed is weighted.

| INPUT VOLTAGE * | | | OUTPUT LINES ** | | | |
|---|---|---|---|---|---|---|
| $>V_1$ | $>V_2$ | $>V_3$ | 41 | 42 | 43 | 44 |
| 0 | 0 | 0 | 1 | 0 | 0 | 0 |
| 1 | 0 | 0 | 0 | 1 | 0 | 0 |
| 1 | 1 | 0 | 0 | 0 | 1 | 0 |
| 1 | 1 | 1 | 0 | 0 | 0 | 1 |

* 0: "NO"
1: "YES"

** 0: ≈ 0 VOLTS
1: ≈ $V_{CC}$ VOLTS

INVENTOR

WILLIAM C. CHOATE

René E. Grossman

ATTORNEY

INVENTOR

WILLIAM C. CHOATE

René E. Grossman

ATTORNEY

INVENTOR
WILLIAM C. CHOATE
René E. Grossman
ATTORNEY

INVENTOR
WILLIAM C. CHOATE
René E. Grossman
ATTORNEY

LINEAR EMBEDDED NONLINEAR ADAPTIVE PROCESSOR

This invention relates to signal translation and more particularly to optimum processors and predictors and apparatus and methods useful in their construction wherein linear subprocessors are embedded within an optimal nonlinear processor.

A linear operator or processor is one for which the following property holds; if $x_1$ is the response or output to input $u_1$, and $x_2$ is the response or output to input $u_2$, then the response to input $u=u_1+u_2$ is $x=x_1+x_2$ for all $u_1$ and $u_2$.

A nonlinear operator does not produce outputs in the foregoing relation.

Optimal nonlinear processors are highly useful in connection with such challenging problems as identification, control, filtering, smoothing, prediction, modeling and classification.

Linear processors and predictors according to a mean square error criterion are well known in the art. Such systems are theoretically discussed by Norbert Wiener in his work entitled "The Fourier Integral and Certain of its Applications" published in 1933 by Dover Publications Inc. Wiener also described realization of a nonlinear system. The theoretical aspects of the Wiener theory of nonlinear system characterization may be employed in the manner disclosed in the thesis of Amar G. Bose, Massachusetts Institute of Technology, June, 1956, entitled "A Theory of Non-linear Systems," reproduced in M.I.T. Research Laboratories of Electronics Technical Report No. 309.

The use of the Weiner theory is further disclosed by Bose in U.S. Pat. No. 3,265,870 issued Aug. 9, 1966.

In applicant's copending U.S. Pat. application Ser. No. 732,152, filed May 27, 1968, there is disclosed and claimed a highly improved nonlinear processor over the Wiener filter implemented by Bose by providing for minimization of the instrumentation necessary to apply the Wiener-Bose teachings to signal translation.

In the system of the Bose U.S. Pat. No. 3,265,870, as the complexity of the processor is increased, the number of filter coefficients necessary to specify the processor grows rapidly. In the Bose patent, $s$ Laquerre coefficients are employed with $n$ gate functions for each coefficient. Thus there are $n^s$ coefficients to evaluate. Such coefficients were represented by charges stored on capacitors. The number of coefficients to be so represented further increases when the number of gate functions employed in Bose increases in order to quantize into smaller cells the function space of the input signal. Bose teaches that such reduction of filtering error is desired but that it leads to a very large number of coefficients to evaluate.

The present invention is applicable to both the Bose system and to applicant's prior system. The present invention involves use in a nonlinear processor of selectable linear subprocessors. More particularly, in accordance with the present invention, a nonlinear processor is provided with a plurality of linear subprocessors effectively incorporated in the nonlinear processor, the linear processors being trained to minimize the error in the mean square sense to provide weighting factors which in execution are employed to modify or weight the processor input signals as to produce the desired output.

More specifically, and in use in connection with applicant's prior processor of the feedback type, the weighting factors would be applied to all system input signals including feedback signals.

For a more complete understanding of the present invention and for further objects and advantages thereof, reference may now be had to the following description taken in conjunction with the accompanying drawings in which.

Figures 1, 3, 4:
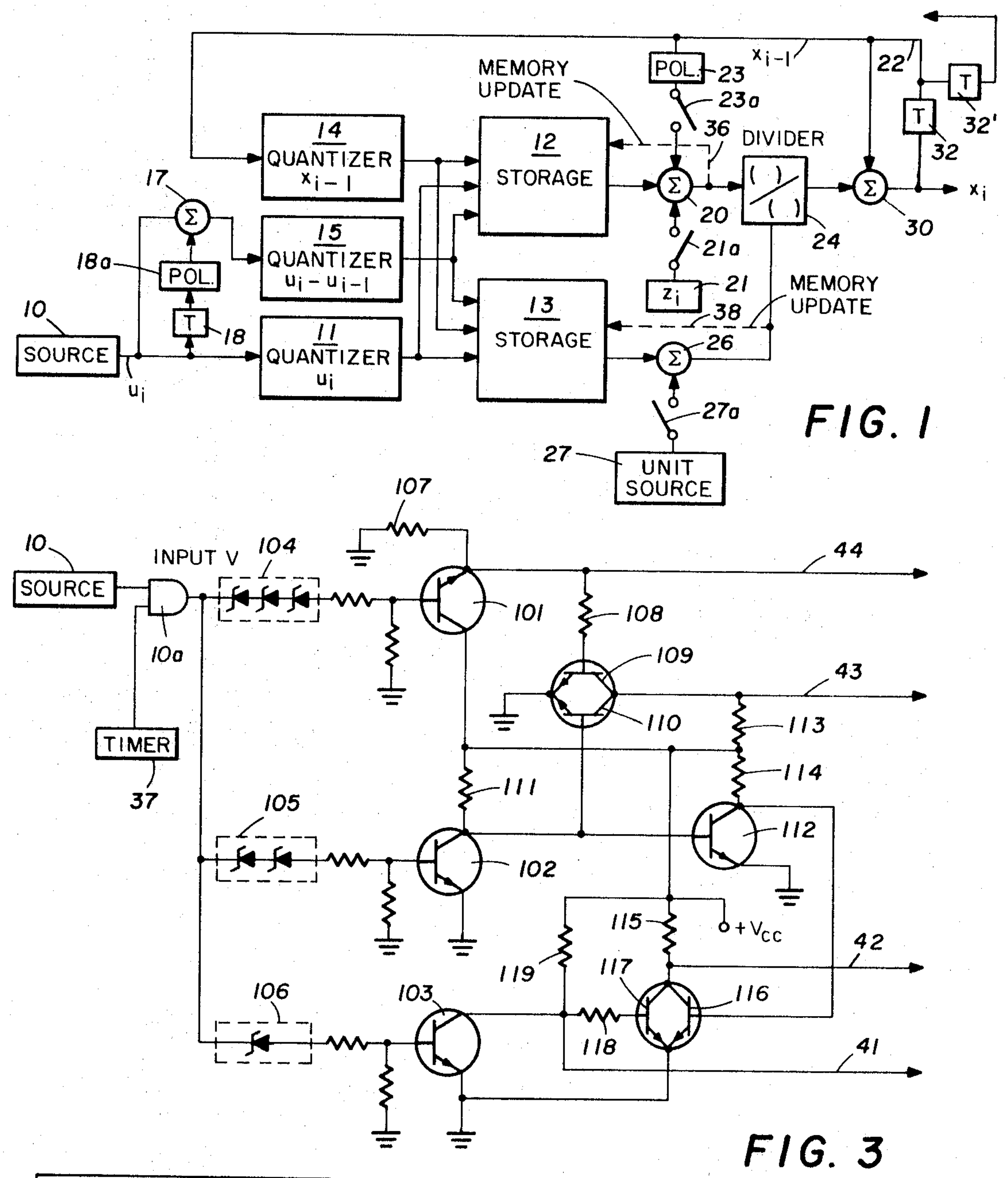
FIG. 1 is a block diagram of the invention disclosed and claimed in application Ser. No. 732,152.
FIG. 3 illustrates a four-level quantizer circuit.
FIG. 4 is a table illustrating the operation of the circuit of FIG. 3.

The system shown in FIG. 1 represents a feedback minimized optimum nonlinear filter so described and claimed in said application Ser. No. 732,152 and will be described as background to the present invention.

The nonlinear processor of FIG. 1 may be trained for optimum processing of single valued time varying function $u$ characterized by two components $u(t)$ and $[u(t)-u(t-T)]$ in the manner disclosed in a generic sense in the Bose U.S. Pat. 3,265,870 but with provision for reducing the required storage by many orders of magnitude. The use herein of a bar under a given symbol, eg;$\underline{u}$ signifies that the signal so designated is a multicomponent signal, eg:$u(t)$ and $u(t)-u(t-T)$. The reduction in required storage is accomplished through the use of a feedback operation which at any one instant requires only one sample of each of the two components of the input signal $u$ and thus materially minimizes the storage problem. As in the Bose patent, the processor is trained in dependence upon some known or assumed function which is a desired output such that the output function $x$ corresponds with $z$ for inputs having statistics similar to $u$. Thereafter the processor will respond to signals $u'$, $u''$, etc. in an optimum manner.

The training of the system of FIG. 1 will first be described following which the changes to carry out operations on signals other than that used for training will be described.

TRAINING

In FIG. 1 the first component of signal $u$ from a source 10 forms the input to a quantizer 11. The output of quantizer 11 is connected to each of a pair of storage units 12 and 13. The storage units 12 and 13 will in general have like capabilities and will both be jointly addressed by signals in the output circuits of the quantizer 11 and quantizers 14 and 15. The storage units 12 and 13 are multielement storage units capable of storing different electrical quantities at a plurality of different addressable storage locations.

The third quantizer 15 has been illustrated also addressing both storage units 12 and 13 in accordance with the second component of the signal $u$ derived from source 10, the delay 18 and the inversion unit 18*a*. More particularly, if the signal sample $u_i$ is the contemporary value of the signal from source 10 then the input applied to quantizer 15 is $u_i-u_{i-1}$. This input is produced by applying to a summing unit 17$u_i$ and the negative of the same signal delayed by one sample increment in the delay unit 18. For such an input, the storage units 12 and 13 may be regarded as three dimensional matrices of storage elements. In the description of FIG. 1 which immediately follows, the quantizer 15 will be ignored and will be referred to later.

The output of storage unit 12 is connected to an adder 20 along with the output of a unit 21 which is a signal $z_i$, the contemporary value of the desired output signal. A third input is connected to the adder 20 from a feedback channel 22, the latter being connected through an inverting unit 23 which changes the sign of the signal.

The output of adder 20 is connected to a divider 24 to apply a dividend signal thereto.

The divisor is derived from storage unit 13 whose output is connected to an adder 26. A unit amplitude source 27 is also connected at its output to adder 26. The output of adder 26 is connected to the divider 24 to apply the divisor signal thereto. A signal representative of the quotient is then connected to an adder 30, the output of which is contemporary value $x_i$ the processor output. The adder 30 also has a second input derived from the feedback channel 22. The feedback channel 22 transmits the processor output signal $x_i$ delayed by one unit time interval in the delay unit 32, i.e., $x_{i-1}$. The feedback channel 22 also is connected to the input of the quantizer 14 to supply the input signal thereto.

A feedback channel 36 leading from the output of adder 20 to the storage unit 12 is provided to up-date the storage unit 12. Similarly a channel 38 leading from the output of adder 26 is connected to storage unit 13 and employed to up-date memory 13.

During the training phase, neglecting the presence of quantizer 15, the system operates as will now be described. The contemporary value $u_i$ of the signal $u$ from source 10 is quantized in unit 11 simultaneously with quantization of the preceding output signal $x_{i-1}$ (which may initially be zero) by quantizer 14. The latter signal is provided at the output of delay unit 32 whose input-output functions may be related as follows:

$T$ is the delay in seconds, $$x_i=x(iT+T_o), \text{ and} \qquad (1)$$

$$x_{i-1}=x[(i-1)T+t_o], \qquad (2)$$

where $i$ is an integer, $T$ is the sampling interval, and $t_o$ is the time of the initial sample. The two signals thus produced by quantizers 11 and 14 are applied to both storage units 12 and 13 to select in each unit a given storage cell. Stored in the selected cell in unit 12 is a signal representative of previous values of the output of adder 20 as applied to this cell by channel 36. Stored in the corresponding cell in unit 13 is a condition representative of the number of times that that cell has previously been addressed, the contents being supplied by way of channel 38. Initially all signals stored in both units 12 and 13 may be zero. The selected stored signals derived from storage array 12 are applied synchronously to adder 20 along with $z_i$ and $-x_{i-1}$ signals.

The contemporary output of adder 20 is divided by the output of adder 26 and the quotient is summed with $x_{i-1}$ in adder 30 to produce the contemporary processor response $x_1$. The contemporary value $x_i$ is dependent on the contemporary value $u_i$ of $u$, the contemporary value $z_i$ of the desired output $z$ and negative of $x_{i-1}$, i.e.: $(-x_{i-1})$, as well as the signals from the addressed storage cells.

It will be found that upon analysis the system functions in a manner which may be described in the following terms involving a differential equation in vector form. A nonlinear system may be characterized by a vector differential equation $$\dot{\underline{x}}=g(x,u,t) \qquad (3)$$

That is, $\dot{x}$ is the time derivative of the signal $x$ and is a vector-valued function $g$ of $x$, $u$, and $t$. The function $g$ in a theoretical sense described the system and may allow the first order vector valued differential equation (3 ) to represent a system governed by a differential equation of multiorder. In important cases of stationary systems, time does not appear as a parameter of $g$. This will be the case for the systems considered first herein.

By choosing the time increment T sufficiently small, the variation of $x(t)$ can be made small in any interval $(t,t-T)$, subject only to reasonable physical constraints. Then equation (3) can be approximated $$x_i=T\,g(x_{i-1},u_i)+x_{i-1} \qquad (4)$$

Here the problem is to determine the first element on the right of equation (4). The feedback provision of the present invention can be shown to proceed for determination of the optimum operation $Tg$ of equation (4).

The functions above described in connection with the system of FIG. 1 provide the signal $x_i$ automatically.

POST TRAINING OPERATION

The system shown in FIG. 1 establishes voltage conditions which represent the optimum nonlinear processor for treating signals having the same statistics as the signal $z(t)$ upon which the training is based.

After the system has been trained based upon the desired output $z$ over a statistically significant sequence of $u$ and $z$, the switches 21a, 23a and 27a may then be opened and a new input signal $u'$ employed whereupon the processor operates optimally on the signal $u'$ in the same manner as above described but with the three signals $z_i$, $x_{i-1}$ and unity no longer needed within the update channels.

In the system as shown in FIG. 1, quantizer 15 provides an output dependent upon the differences between sequential samples $u_i$ and $u_{i-1}$, employing a delay unit 18 and a polarity reversal unit 18a. In this system a single delay unit 18 is provided at the input and a single delay unit 32 is provided at the output. In general, more delays could be employed on both input and output. However, physical considerations will generally require that there will not be required more delay units on the input than on the output. Further, if the system is responsive to pass low frequencies selectively, relative to high frequencies, then fewer delays would be required on the input than on the output. In use of the system with quantizer 15, storage units 12 and 13 may conveniently be regarded as three dimensional. Of course, elements of the input vector and the output vector need not be related by simple time delays.

EMBEDDING

Figure 2:
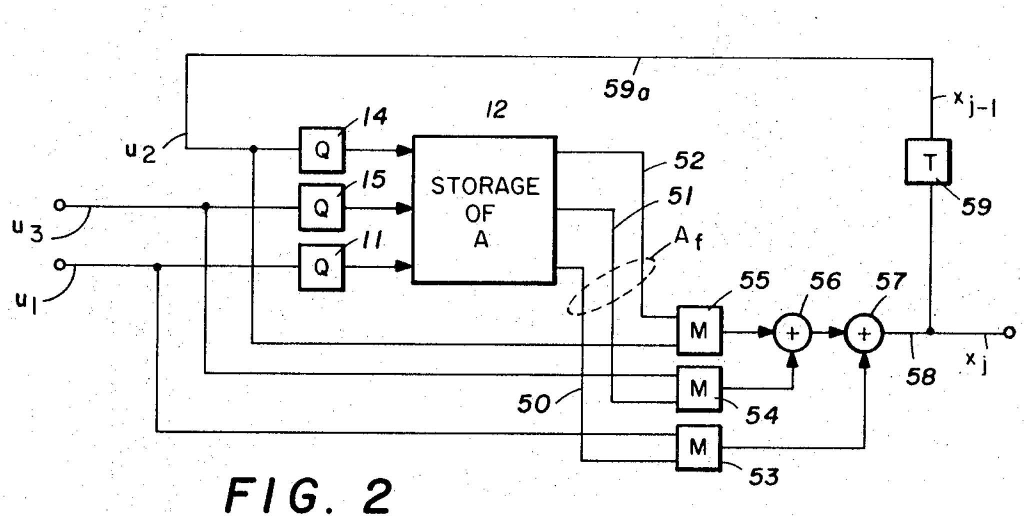
FIG. 2 is a diagram illustrating an embodiment of the present invention.

In FIG. 2 of application Ser. No. 732,152 there was presented an analog embodiment of the improved processor wherein changes in voltages on capacitors were produced during training so that, the response of the processor to a given input, during an execution phase following completion of training, would be the desired response.

One matrix of storage elements was provided to be incremented each time a given storage cell was addressed in response to at least two signals, the contemporary value of the input signal and a preceding value of an output signal.

The present invention provides for linear subprocessor selection from within a matrix of linear subprocessors. In the preferred form the selection is dependent upon the contemporary value of the input signal and the previous value of the output signal.

In said prior application a second matrix was employed to store in a given cell a voltage representative of the number of times a corresponding cell in the first matrix has been addressed. The signals in both matrices were then employed during the execution phase to provide the desired processor output.

The present invention is an improvement over that system to permit memory storage reduction without sacrificing accuracy, it having been found that in many instances many cells in each of the matrices were never called upon. Further, the present invention affords optimal linear interpolation and optimal linear extrapolation. The present invention applies to both the feed forward nonlinear processor such as exemplified in U.S. Pat. No. 3,265,870 to Bose and to the feedback processor configuration of applicant's prior application Ser. No. 732,152. The processor of the present invention reduces to exactly the optimal nonlinear processor when the linear processor is truly optimum. In this case there is no quantization error. Because the memory requirements are less, a smaller training set is needed in the present invention. One embodiment of the invention is shown in FIG. 2.

Input signals $u_1$, $u_2$, and $u_3$ are applied to quantizers 11, 14 and 15 whose outputs control selection of linear subprocessors in a matrix A. The system operates to provide weighting factors or signals which may be selected on lines 50–52 and applied to multipliers 53–55. Multipliers 53–55 are also supplied with inputs $u_1$, $u_2$, and $u_3$. Adders 56 and 57 operate in conjunction with multipliers 53–55 to provide the desired output $x_{j+1}$ on line 58. A delay unit 59 provides a signal $u_2$ on line 59a where $u_2=x_j$.

Before considering details of the internal structure of unit A, the quantizers 11, 14 and 15 will be described.

FIGURE 3

The quantizers 11, 14 and 15 may be of the type shown in FIG. 3. Source 10 is connected by way of an AND-gate 10a as controlled by timer 37. A "one" voltage will be produced on only one of the lines 41–44 depending on the amplitude of the signal at the instant the timer opens gate 10a. The quantizer comprises three input transistors 101, 102 and 103. The bases of transistors 101–103 are signal energized through Zener diode units 104–106, respectively, all of which are connected to the output of gate 10*a*. The transistor 101 is connected at its emitter through resistor 107 to ground and to line 44. The emitter is also connected by way of resistor 108 to the base of transistor 109 which is connected in parallel with the transistor 110. The emitters of transistors 109 and 110 are connected to ground. The collectors are connected to line 43. The base of transistor 110 is connected to the collector of transistor 102 whose emitter is grounded, and to the base of a transistor 112. Line 43 is connected to the supply source +Vcc by way of resistor 113 and by way of resistor 114 to the collector of transistor 112. The juncture between resistors 113 and 114 is connected to the collector of transistor 101 and, by way of resistor 115, to line 42 which is common to the collectors of transistors 116 and 117. The base of transistor 116 is connected to the collector of transistor 112. The base of transistor 117 is connected by way of resistor 118 to line 41 and to the collector of transistor 103. The emitters of transistors 116 and 117 are connected to ground.

In operation, if the signal from unit 10*a* is less than the breakdown voltage of unit 106, transistor 103 is off, its collector is at the supply potential and thus line 41 is at high potential providing a "one" output. Since the collector of transistor 103 is at high potential, transistor 117 conducts, providing a voltage drop across resistor 115 so that line 42 is essentially at ground potential or "zero".

In a similar manner, transistor 101 and 102 are off. This means that the base of transistor 110 is at high potential thus conducting so that line 43 is substantially at ground potential. Since transistor 101 is not conducting, line 44 is likewise at ground potential.

When the input signal exceeds the breakdown potential of unit 106 but does not exceed the breakdown potential of units 104 and 105, transistor 103 conducts so that line 41 is at ground potential. Driving the base of transistor 117 to ground stops conduction therein so that line 42 is high. The circuit involving transistors 116 and 117 is a NOR circuit. Since transistor 102 is not conducting the transistor 112 is conducting so that its collector is substantially at ground causing transistor 116 to be nonconductive. Likewise, transistor 102 causes transistor 110 to conduct placing line 43 at ground potential. As before, transistor 101 is not conducting and line 44 remains at ground. Thus only line 42 is high.

The same circuit operation can now readily be visualized for the case where the signal exceeds the breakdown potential of unit 105 but not 104 and for the case where the input signal exceeds the breakdown potential of unit 104.

It will thus be seen that the thresholds, or breakdown potentials for units 104–106 are selected in dependence upon the desired quantizing levels.

FIGURE 4

As indicated in the table of FIG. 4, if the input voltage in FIG. 3 is less than the level $V_1$ of diode unit 106, then line 41 will be energized and the remainder of lines 42–44 will be deenergized. If the voltage is greater than $V_1$ and less than the level $V_2$ of diode unit 105, then line 42 only will be energized. If the voltage is greater than $V_2$ but less than the level $V_3$ of diode unit 104, then line 43 only will be energized. If the voltage is greater than $V_3$, then line 44 only will be energized. Diode units 104–106 are illustrated as Zener diodes. They differ one from another by their threshold voltages which satisfy the inequality $V_1<_{12}<V_3$. They may comprise single diodes of different breakdown voltages or as, illustrated in FIG. 3, a multiplicity of like units in series.

FIGURE 5

Figure 5:
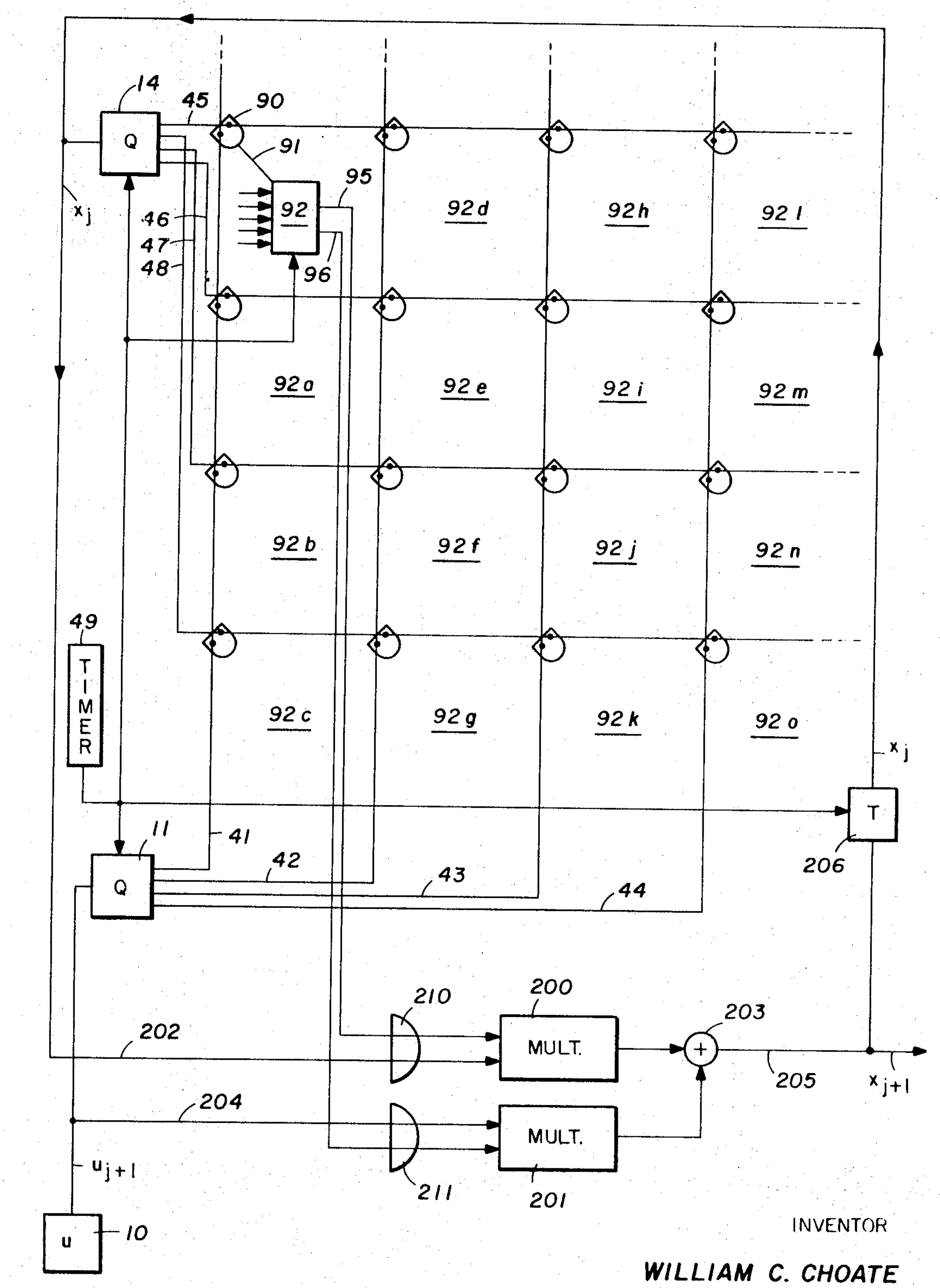
FIG. 5 is a schematic diagram of one embodiment of the present invention.

FIG. 5 illustrates a two input system which, like FIG. 2, involves selection from among the matrices of linear subprocessors.

In FIG. 5, the quantizer 11 has output lines 41–44, one for each of four quantization levels. It will be understood that more levels and thus more output lines may be used, requiring a larger matrix than the 4×4 matrix shown in FIG. 5.

Quantizer 14 similarly has four output lines 45–48. An AND-gate 90 is connected to lines 41 and 45. Similarly, an AND gate is connected at each intersection of lines from set 41–44 and lines from set 45–48 to select one linear subprocessor at a time. The particular subprocessor selected will depend upon the quantization levels of the two signals $x_j$ and $u_{j+1}$ where $x_j$ is the contemporary processor output and $u_{j+1}$ is the next succeeding value of the input signal $u$. Gate 90 has an output line 91 which enables a subprocessor 92. A timer 49 is connected to each of the quantizers 11 and 14, to an output time delay unit 206 and to the subprocessor 92 so that the signals will be sampled on a time spaced basis for processing, generally as described in application Ser. No. 732,152.

For the two input case, to which FIG. 5 relates, processor 92 has five inputs and two outputs. The configuration will depend upon the particular mode employed in processor 92 for minimizing the means square error. For the purpose of the present description it will be assumed that the mean square error will be minimized in accordance with the Widrow technique which is well known and in general is described in a paper by Widrow, Adaptive Filter I: Fundamentals, Stanford University Center for Systems Research, Systems Theory Laboratory, Palo Alto, California, and identified as S.E.L. Report No. 66–126.

It will be understood in FIG. 5 that there are similar subprocessors 92*a*, 92*b*... 92*o* so that one may be selected for any of the 16 combinations of control states on lines 41–44 and lines 45–48.

Figures 6, 7:
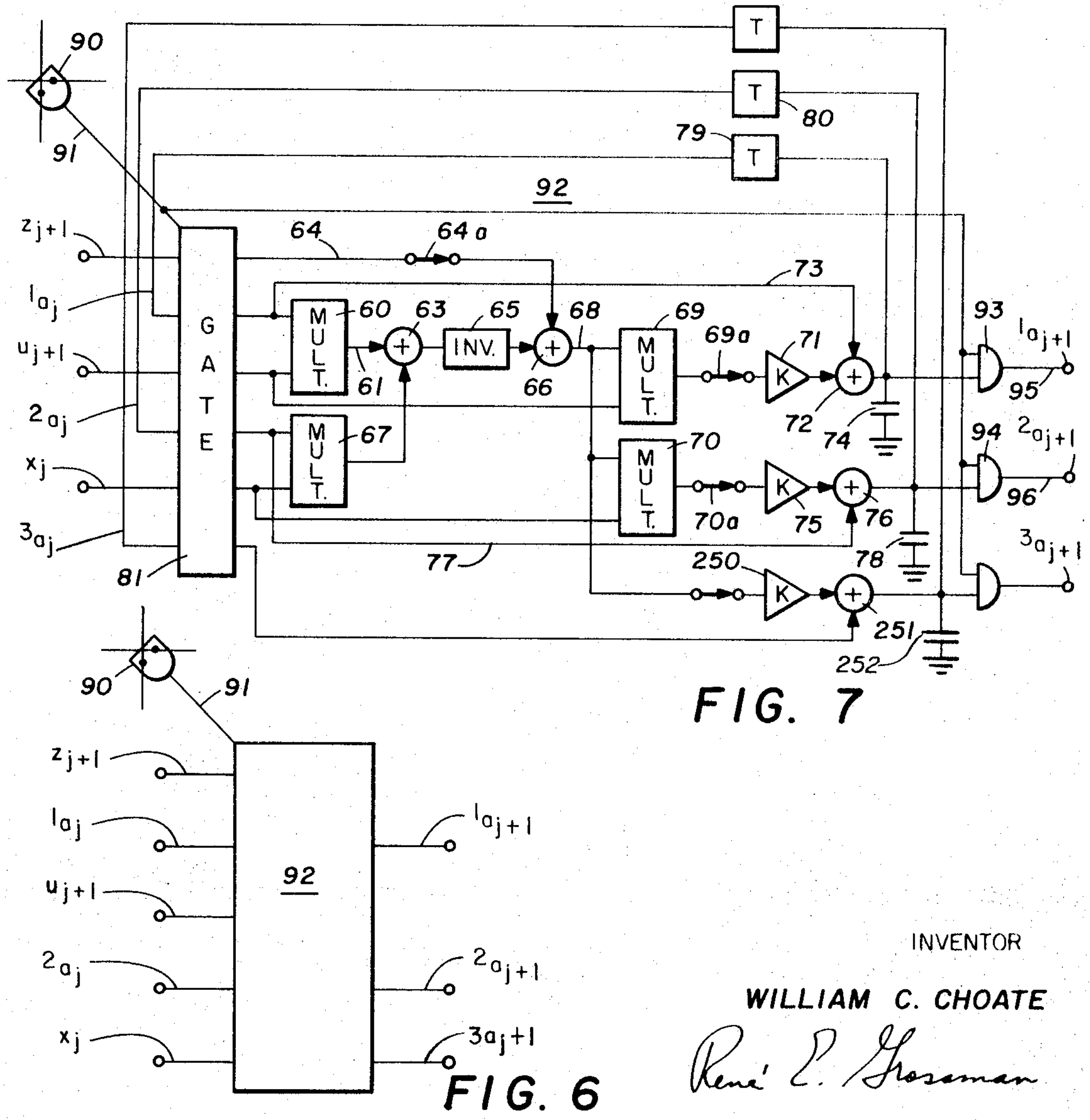
FIG. 6 is an enlarged view of one linear subprocessor of FIG. 5, identifying the inputs and outputs of the linear subprocessor.
FIG. 7 is a detailed diagram of the linear subprocessor of FIG. 6.

FIGURES 6 and 7

In FIG. 6 the input and output functions to subprocessor 92 are illustrated. The subprocessor in one form is shown in FIG. 7 and serves to provide the outputs in accordance with the following expressions:

$$^1a_{j+1} = {}^1a_j + k\, e_{j+1}'\, u_{j+1} \quad (5)$$

$$^2a_{j+1} = {}^2a_j + k\, e_{j+}'\, x_j \quad (6)$$

$$e_{j+1}' = z_{j+1} - {}^1a_j\, u_{j+1} - {}^2a_j\, x_j \quad (7)$$

where $z_{j+1}$ is the next value of the desired output signal employed during training, $^1a_j$ is the contemporary value of a first weighting factor established in the subprocessor, $u_{j+1}$ is the next value of the input signal $u$, $^2a_j$ is the contemporary value of the second weighting function developed in the subprocessor, $x_j$ is the contemporary value of the subprocessor output corresponding to $x_i$ of FIG. 2, and $k$ is an amplification factor, generally less than 1. In FIG. 7, a first multiplier 60 has two inputs $^1a_j$ and $u_{j+1}$. The output of multiplier 60 is connected by way of line 61 to an adder 63.

Inverter 65 leads to one input of a second adder 66. A second multiplier 67 has two inputs supplied by the signals $^2a_j$ and $x_j$. The output of multiplier 67 is applied to adder 63. The second input to the adder 66 is supplied by way of line 64 to apply the signal $z_{j+1}$.

The output of adder 66 is then applied by way of line 68 to one input of each of third and fourth multipliers 69 and 70. The second input to multiplier 69 is the signal $u_{j+1}$. The output of multiplier 69 is applied to an amplifier 71, having gain $k$, whose output is applied to an adder 72. The second input to adder 72 supplied by line 73 is the signal $^1a_j$ so that the output, which may be stored in a storage unit represented by capacitor 74, is the output $^1a_{j+1}$.

The output $^1a_{j+1}$ is a weighting factor or quantity which may be employed in the production of the output signal $x_{j+1}$ by multiplying the input signal $u_{j+1}$ and summing the product with a similar product between the second input $x_j$ and a second weighting function, $^2a_j$.

The second weighting function is produced by supplying multiplier 70 with the second input signal $x_j$ and applying the output thereof by way of an amplifier 75 of gain $k$ to an adder 76. The second input to adder 76 is supplied by way of line 77 with the signal $^2a_j$. Thus the second subprocessor output, which may be stored on a unit represented by capacitor 78, is the second weighting function $^2{}_{j+1}$. The quantities thus stored, as on capacitors 74 and 78, represent the outputs of the linear subprocessor 92 embedded in the nonlinear processor of FIG. 5.

In order to supply the two inputs $^1a_j$ and $^2a_j$ it will be noted that the outputs are connected in feedback loops which include storage and delay units 79 and 80, respectively. By this means the contemporary values of the linear subprocessor outputs may be stored for one sampling interval and employed as the inputs to the processor by way of a gate 81. The gate 81 is enabled by AND-gate 90. The outputs of processor 92 are connected by way of AND-gates 93 and 94 one input of each being supplied by the output of AND-gate 90.

FIGURE 5—CONTINUED

Directing attention again to FIG. 5, it will be seen that the output lines 95 and 96 from subprocessor 92 are connected by way of OR-gates 210 and 211 to multipliers 200 and 201, respectively. The second input of multiplier 200 is supplied by way of line 202 to apply the signal representative of the contemporary output $x_j$ thereto. The output of multiplier 200 is applied to an adder 203. The succeeding value of the input from source 10, the signal $u_{j+1}$, is applied to multiplier 201 by way of line 204. Multiplier 201 supplies the second input to the adder 203 so that the succeeding value of the output $x_{j+1}$ appears on the output channel 205. This signal is stored and delayed one sample interval in the feedback channel delay unit 206.

By this means, each subprocessor develops a pair of weighting functions, as on lines 95 and 96. The latter functions are then multiplied with the contemporary output value $x_j$ and with the next value of the input signal $u_{j+1}$, to provide a summation signal on line 205 which is the processor output $x_{j+1}$.

The foregoing description has been based upon the adoption and use of the Widrow technique for minimizing the means square error in the development of the weighting functions on lines 95 and 96. While only output lines 95 and 96 of the subprocessors have been shown, it will be understood similar output lines from each of the other linear processors may be connected through the OR-gates 210 and 211 to the multipliers when called upon by the matrix decoding signals from quantizers 11 and 14.

The description thus far has dealt with the training period. During execution, as contrasted with training, the circuit of FIG. 7 would be modified by opening switches 64*a*, 69*a* and 70*a* so that there would be no updating of the weighting functions $^1a_j$ and $^2a_j$.

An examination of FIGS. 5 and 7 reveals that there is unnecessary replication if a linear subprocessor is provided for each of the cells in the matrix of FIG. 5. Thus, the embodiment shown in FIG. 8 will be preferred, FIG. 5 having been provided herein in order to facilitate an understanding of the development of the weighting functions.

FIGURE 8

Figure 8:
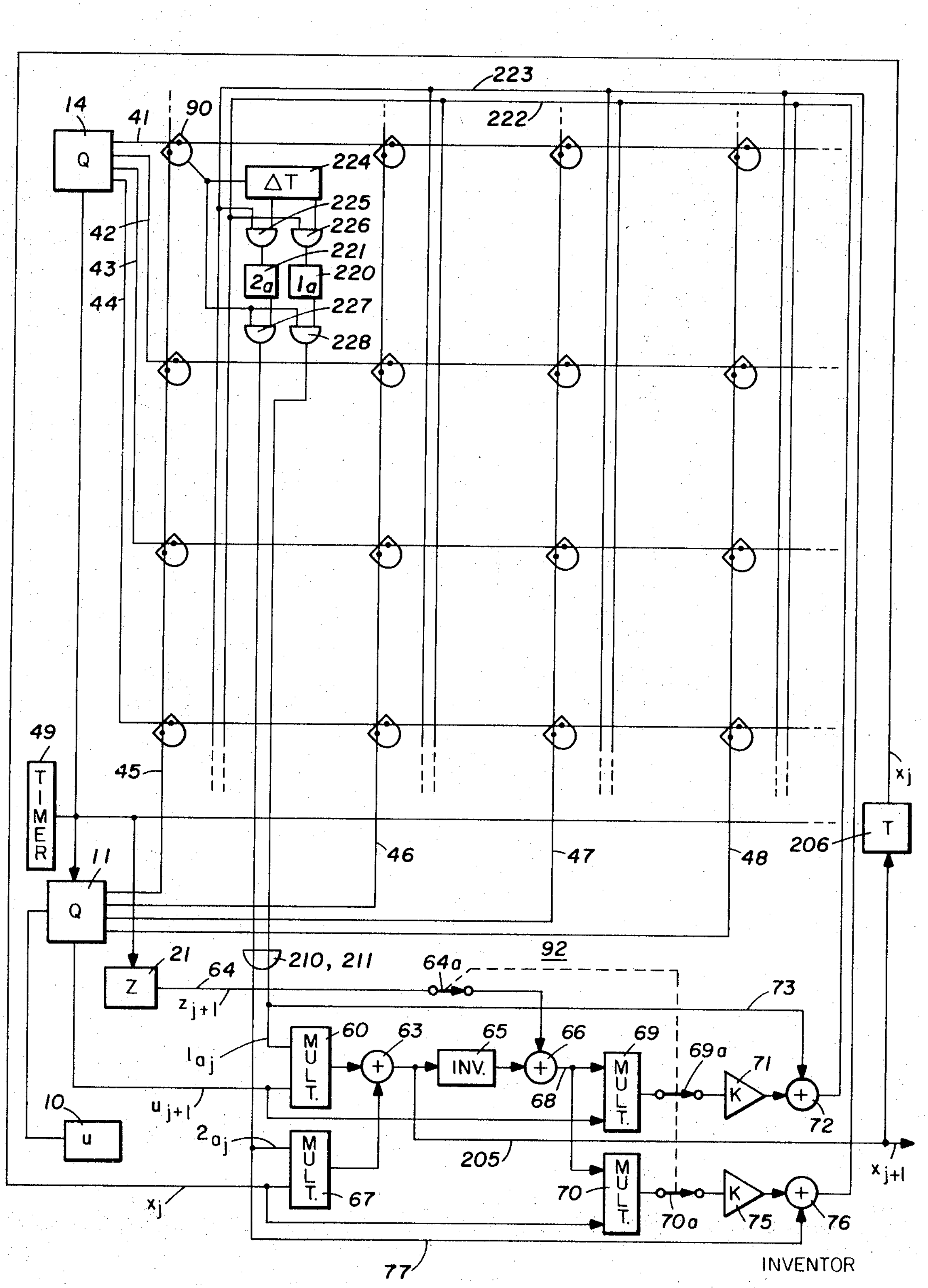
FIG. 8 is a modification of the system of FIG. 5.

FIG. 8 has been given the same reference characters as in FIGS. 1, 5 and 7 where appropriate.

In FIG. 8 only one linear subprocessor 92 is employed. In this system, the linear subprocessor 92 serves all of the cells in the matrix. Provision is made in each matrix cell for storage and updating of the weighting factors $^1a_j$ and $^2a_j$. More particularly, in the cell associated with AND-gate 90, two storage units 220 and 221 are provided. They serve to store the contemporary value of the weighting functions $^1a_j$ and $^2a_j$ respectively. The latter weighting functions are derived from the outputs of adders 72 and 76, respectively, and are applied to the cell by way of lines 222 and 223, respectively.

AND-gate 90 is connected by way of a time delay unit 224 and AND-gates 225 and 226. Line 222 is connected to AND-gate 226. Line 223 is connected to AND-gate 225. The output of AND-gate 90 is also connected to one input of each of AND-gates 227 and 228 whose outputs are applied by way of OR-gates 210–211 to the linear subprocessor 92. The storage units 220 and 221 are connected to AND-gates 228 and 227, respectively.

In operation, when the cell is addressed by enabling AND-gate 90, the values $^1a_j$ and $^2a_j$ stored in units 220 and 221 are applied as inputs to multipliers 60 and 67, respectively. Thereafter, at the expiration of the delay imposed by unit 224, the updated values, namely the values $^1a_{j+1}$ and $^2a_{j+1}$, appearing on lines 222 and 223 respectively, are then stored in storage cells 220 and 221, respectively. Thus, only a single linear subprocessor is necessary.

The system will be used as shown in FIG. 8 during training where the training depends upon the statistics of the signal $u$ from the source 10 and the desired output $z$ from source 21.

The invention has been described through the use of line diagrams for the purpose of aiding in an understanding of the invention. Other types of linear processors may be employed to minimize the mean square error so that use of the Widrow technique is not critical. However, from FIG. 5, taken in conjunction with FIGS. 6 and 7, it will be appreciated that the nonlinear optimum processor has embedded within it linear processors which carry out the objectives discussed above.

FIG. 5 is based upon an understanding that a linear subprocessor would be provided at each of the points in the matrix. In FIG. 8 only a single linear subprocessor is involved with storage, at each of the points in the matrix, of the weighting factors which characterize the linear subprocessor. Thus, as used in the present description, "selection of a linear subprocessor " shall be taken to mean selection of a system shown in FIGS. 5 and 7 or as shown in FIG. 8 where only a single linear subprocessor is employed.

Further, the invention is not limited to the specific circuit nor to any particular analog implementation described herein but has general applicability as may be understood from the following considerations, from which were developed the specific case involving the Widrow technique.

As above indicated the input is, in general, a vector $u=[u_1, u_2 \ldots u_{RAH}]^T$ where T represents the transpose from a column to a row, $\Phi_1$ is the quantization vector for $u_1$, $\Phi_2$ is the quantization vector for $u_2$, etc. For convenience, the $\Phi_i$ may be unit vectors. The vector function $f$:

$$f=[f_1 f_2 \ldots f_P]^T \qquad (8)$$

is then defined as follows:

$$f=\Phi_1 X \Phi_2 X \ldots \Phi_R \qquad (9)$$

Equation (9) relates to a direct vector product where
$P=M M_2 \ldots M_R$
and $M_i$ = the number of components in $\Phi_i$.
In the light of the above, linear embedding may be defined by the following equation:

$$x=u^T A f \qquad (10)$$

where $x$ is the (scalar) output; and $A$ is a set of output coefficients. Multiple outputs can be accommodated by having several sets of coefficient matrices $A_1$, $A_2$, ...

The optimum weights $\underline{\bar{A}}$ are determined as follows:
The mean square error is defined as $$E=g\overline{z^2}-\overline{2zu^T}Af+\overline{u^T Aff^T A^T u} \qquad (11)$$

where $z$ is the desired output and the bar notation denotes averages.

Taking the gradient of E with respect to the $j^{th}$ column of $A$, $a_j$, and equating to zero, the following relation for the optimum weights is obtained.

$$\overline{F_j guu^T} \underline{\bar{a}_j} = \overline{f_j gzu},\ j=1, 2, \ldots P \qquad (12)$$

If the $\Phi_1$ are made unit vectors as suggested above, $f_j$ will be a one or a zero, i.e.:

$$\left\{ f_1 \begin{matrix} =1 \\ =0 \end{matrix} \right. \qquad (13)$$

and $g_j$ may be obtained by first determining the functions $\overline{guu^T}$ and $\overline{gzu}$ over those instants $f_j=1$. Thereafter the functions $\overline{guu^T}\tilde{\underline{\underline{a}}}=\overline{gzu}$ are determined. Where the Widrow algorithm as disclosed above is used, the procedure is to produce functions according to the following relation:

$$\tilde{\underline{\underline{a}}}_{ji+1}=\tilde{\underline{\underline{a}}}_{ji}-k(z_i-a_{ji}^T u_i)u_i \qquad (14)$$

where equation (14) is implemented when $f_j=1$ and subscript $i$ refers to the iteration number. At the expense of P additional storage cells such as digital words in memory (equation (14) requires RP words) the linearization may be carried out about a mean value for each range. That is, $$\overline{gff^T}\tilde{\underline{\underline{a}}}_0=\overline{gfz} \qquad (15)$$

may be evaluated for $a_0$ and $$z^1=z-\tilde{\underline{\underline{a}}}_0^T f \qquad (16)$$

may then be substituted for $z$ in equation (14).

The utility of linear embedding is further shown when it is appreciated that a straight line approximator is more effective than a constant approximation for continuous functions. Linear embedding serves to reduce complexity. Specifically, if there are R inputs and M quantization ranges for each, matrix A will have R rows and $M^R$ columns or $RM^R$ elements. Without linear embedding, the complexity for the same accuracy is $$R\,(M+K)^R \qquad (17)$$

That is, K additional quantization ranges per input variable is required. Linear embedding is favorable whenever $$R^{1/R}<K. \qquad (18)$$

Linear embedding afford optimum linear interpolation. Further it affords an ability to extrapolate. That is, it affords an optimum linear estimate in a range that is open ended.

It will be found that if a plot is made of $f$ as a function of output $x$, the function will be linear and will extrapolete to the origin of the coordinate system.

It may be found desirable to introduce a biasing effect which may be implemented as to the following relations the same way that FIG. 8 implements the relations set forth in equations 5–7.

Provision would be made for storage of three weighting coefficients having the following relationship:

$$^1a_{j+1}={}^1a_j+k(e'_{j+1})(^1u_{j+1}) \qquad (19)$$

$$^2a_{j+1}={}^2a_j+k(e_{j+1})(^2u_{j+1}) \qquad (20)$$

$$a_{j+1}={}^3a_j+k(e_{j+1})1) \qquad (21)$$

$$e_{j+1}=z_{j+1}-[^1a_j{}^1u_{j+1}+{}^2a_j{}^2u_{j+1}+{}^3a_j] \qquad (22)$$

In this event, more coefficients will be stored (i.e.: $^1a_{j+1}$, $^2a_{j+1}$, and $^3a_{j+1}$) than inputs to the nonlinear processor (i.e.: $u_{j+1}$ and $x_j$).

This system is implemented as shown in FIG. 7 by use of amplifier 250 of gain $k$ and an adder 251 for storage as on capacitor 252 of the weighting coefficient $^3a_{j+1}$.

It will be appreciated that the nature of the various components of the system of FIG. 1 may be varied depending upon the particular use of the invention. FIGS. 2–7 illustrate an analog storage array. In general, it will be preferred to carry out the present invention through use of a digital computer programmed in accordance with the foregoing. The analog diagrams have been employed to assist in gaining an understanding of the invention, it being recognized that analog and digital systems are interchangeable for most purposes, and one will be employed in preference to the other in dependence upon the nature of the operation to be undertaken. In digital operations magnetic storage arrays, as conventionally used in digital systems, may also be employed as well as other well-known storage systems. The summation units 56 and 57 may be of conventional type. In digital operations they would comprise the digital counterpart of the well-known analog summation units. Time delay unit 59 may comprise a magnetic delay line for either analog or digital operations or may comprise a storage register which will receive and hold a digital word for one sample interval as shown at page 153 of the Richards text. The system components employed in the various drawings, therefore, are, in general, well-known and understood. The organization of the present system provides for feedback in optimizing the processor of the present invention.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an adaptive nonlinear processor, the combination which comprises:

a. linear processor means in said nonlinear processor for generating weighting functions which minimize error between the output signal from said nonlinear processor and a desired output signal, b. means for training said nonlinear processor through said linear processor means for all combinations of quantization levels encountered in training signals which signals include at least one independent input signal and the desired response of said nonlinear processor to said input signal, and c. means for inhibiting modification of said processor for processing additional input signals having statistics like those of said training input signal.

2. The processor of claim 1 wherein storage means are provided for storing a weighting function for each input to said nonlinear processor, multiplication means are provided for each said input, circuit means to apply each weighting function to said multipliers, and summation means responsive to said multiplier to produce the output of said nonlinear processor.

3. In an adaptive nonlinear processor where training signals, including at least one independent training signal, are employed during a training interval, the combination which comprises:

a. a matrix of sets of storage elements, one storage element in each set for each encountered combination of quantization levels of said training signals for storing weighting functions, b. linear processor means operable upon the occurrence of each said combination during said training interval to modify said weighting functions to change said weighting functions to minimize the error in the least square sense between said independent training signal and the desired response of said processor to said independent training signal, and c. means for inhibiting modification while utilizing said weighting functions during execution by said nonlinear processor of an independent input signal of statistics like those of said independent training signal.

4. The combination set forth in claim 3 where each of said sets has elements in number corresponding with the number of said training signals.

5. The combination set forth in claim 3 wherein the number of elements in each said set of storage elements exceeds the number of training signals.

6. A nonlinear optimum adaptive processor, which comprises:

a. a matrix of linear subprocessors, b. selection means responsive to sets of quantization product of each time sample of a plurality of training signals including a desired output signal and at least one input signal having statistics corresponding to statistics of execution signals to be processed by the adaptive processor after a training interval for selecting linear subprocessors from said matrix of linear subprocessors, c. control means for each of said linear subprocessors to generate therein weighting coefficients for modification of said signals to produce an output signal with minimum means square error between the processor response to said input signal and said desired output signal, d. means operable during an execution interval following said training interval for modifying each of the samples of said execution input signals by weighting coefficients produced in response to quantization products of like samples during the training interval, and e. means for summing the modified samples of said execution input signals to produce the nonlinear processor output signal.

7. In the operation of a nonlinear optimum adaptive processor, the steps which comprise:

a. selecting one linear subprocessor from a matrix of linear subprocessors in response to the quantization products of samples of a plurality of quantized training signals including a desired output signal and at least one input signal having statistics corresponding to statistics of execution signals to be processed by the adaptive processor after a training interval, b. generating weighting coefficients during a training interval in each of said linear subprocessors designated by said quantization products for modification of said training signals to produce an output signal having minimum means square error relative to said desired output signal, and c. during an execution interval following said training interval, modifying each of the samples of input signals applied to said nonlinear processor in accordance with weighting functions produced in response to the quantization products of like samples during the training interval, and summing the modified samples of said execution input signals to produce the nonlinear processor output signal.

8. The method of claim 7 wherein only said weighting functions are stored in said matrix.

9. The method of claim 7 wherein the number of the weighting functions stored exceed the number of input signals to said nonlinear processor.

10. In the operation of a nonlinear optimum adaptive processor, the steps which comprise:

a. linearly developing weighting signals on a least mean square error basis in response to each combination of quantization levels encountered in samples of a plurality of training signals during a training interval, b. applying said weighting signals during an execution interval following said training interval to modify each of the samples of input signals to said nonlinear processor, and c. summing the modified samples of said execution input signals to produce the processor output signal.